Dec. 23, 1924.

C. FAUTH

AUTO TRACTION DEVICE

Filed April 11, 1924

INVENTOR

Christian Fauth

Patented Dec. 23, 1924.

1,520,287

UNITED STATES PATENT OFFICE.

CHRISTIAN FAUTH, OF ECORSE, MICHIGAN.

AUTO TRACTION DEVICE.

Application filed April 11, 1924. Serial No. 705,915.

*To all whom it may concern:*

Be it known that I, CHRISTIAN FAUTH, a citizen of the United States, residing in the city of Ecorse, county of Wayne, State of Michigan, have invented certain new and useful Improvements in an Auto Traction Device, and declare the following to be a full, clear, and exact description of the same, such as will enable others skilled in the art to which it pertains to make and use the same, reference being had to the accompanying drawing, which forms a part of this specification.

The object of my invention is to provide a traction device that can be easily attached to the wheel of an automobile when the car becomes stalled in mud or soft soil, and provides a traction for the power wheels for drawing the automobile from the mud, or rut, by use of its own power.

Another object is to provide a traction device that can be made of flexible rope, which will readily conform to the auto wheel, and without injuring the tire or felly to which it is attached.

A further object is to provide a traction device that is easily and efficiently operated and can be manufactured at a low cost.

These several objects are attained in the preferred form by the construction and arrangement of parts more fully hereinafter set forth.

Similar parts on all drawings are marked by similar numerals.

Figure 1:
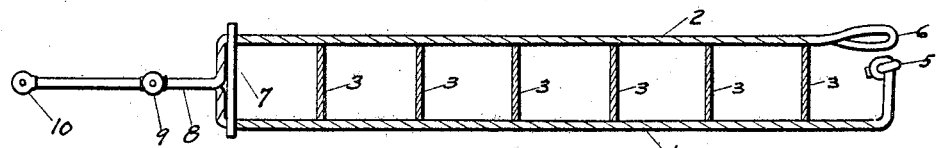
Fig. 1, shows a plan view of my traction device as constructed from rope materials.

I will now describe more fully the detailed construction of my traction device, referring to the drawings and the marks thereon.

The general construction of my traction device comprises double parallel rope sides, joined together at one end thereof, and having the double portion connected together by short connecting ropes, uniformly spaced thereon. The loose end of the rope is provided with a fastening device suitable for attaching to the rim of the auto wheel, while the opposite end of the rope is provided with sockets for receiving ground stakes therein. The device may be made of any suitable material which is flexible and will conform to the surface of the wheel, but the inventor prefers to construct same from rope, although a chain construction will operate as well.

Figure 3:
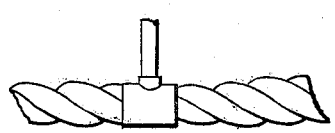
Fig. 3, shows an alternate joint for the cross ropes when joined to the side ropes by means of clips.
Figure 2:
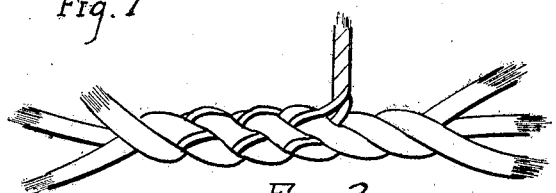
Fig. 2, is an enlarged detail of the joint, or splice, for the short cross ropes as attached to the side ropes.
Figure 4:
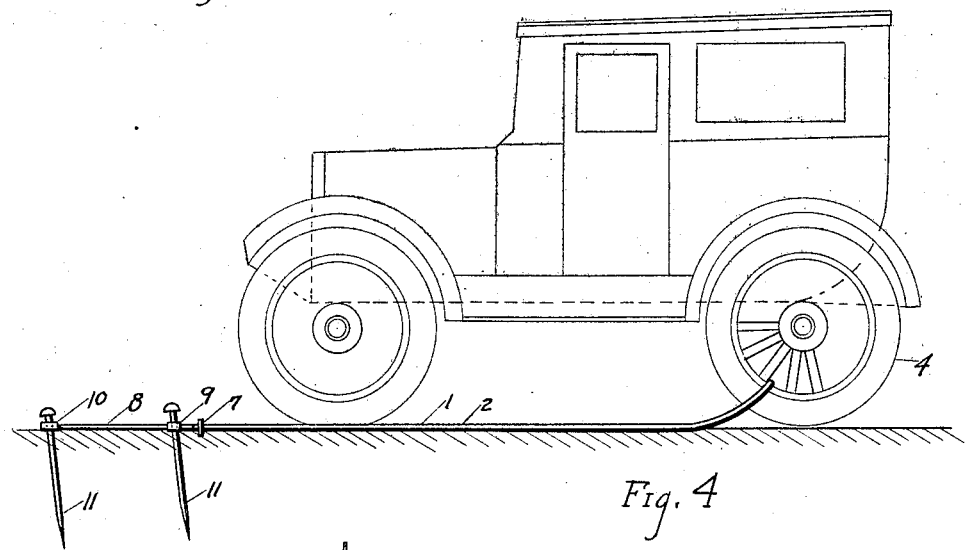
Fig. 4, is an illustration of the traction device as attached to the automobile, when applied for moving the car under its own power.

The side ropes —1— and —2— are arranged parallel to each other, and are connected together by short cross ropes —3—, uniformly spaced along the sides thereof. The cross ropes —3— are attached to the side ropes —1— and —2— by interweaving the ends thereof into the strands of the side ropes, as illustrated in Fig. 2, or they may be attached thereto by means of clips as shown in Fig. 3. The means of attaching the cross ropes to the side ropes is not material to the invention. The cross ropes —3— are spaced sufficiently close together for holding the side ropes near the surface of the wheel as it is rolled thereon. The length of the traction device may be varied as desired, but preferably about twice the length of the automobile upon which it is to be used, and having the cross ropes uniformly spaced throughout the entire length thereof. At one end of the traction strip the ends of the side ropes —1— and —2— are free and extend beyond the last cross rope a sufficient length to encircle the rim and tire of the auto wheel, and the ends thereof attached by joining the button —5— in the loop —6— as are formed on the ends of the side ropes —1— and —2—. At the opposite end of the traction strip is a spreader block —7— mounted between the side ropes —1— and —2—, for the purpose of separating them, and holding same in a position for the tire of the automobile wheel to pass between and engage the cross ropes along the outer tread of the wheel, causing the traction strip to wind up about the outer surface of the auto tire as the auto wheel rotates under power of its own engine and connecting mechanism.

Figure 5:
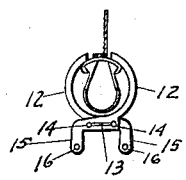
Fig. 5, is a detail of a special locking device for attaching to the wheel end of the rope to the auto wheel when the disc wheel type is used on the car.

Outside the spreader block —7—, the side ropes —1— and —2— are united together and form a single draw rope —8—, and extending a length sufficient for attaching two stake sockets —9— and —10—, and securely fastened thereto. The stake sockets —9— and —10— have openings through the centers thereof for receiving and retaining the ground stakes —11— and to allow the body of said stake to pass through. Should the automobile upon which the traction device is used, be equipped with disc wheels as is common at the present time, a special device is required for attaching same to the rim of the auto wheel, as the rope loop cannot be passed through the wheel. Fig. 5, illustrates a special clamp for attaching to the wheel rim, comprising side clamps —12— provided with slots —13— in the shank portion thereof, and is shaped to inclose the auto tire and rim of the wheel. Rivets —14— are positioned in slots —13—, and allow the side clamps —12— to be adjusted thereon for the various sized auto tires. The stem ends —15— are provided with holes —16— for attaching the ends of the side ropes —1— and —2—, and are so shaped as to keep the ropes separated and open when attached to the auto wheel.

In using my traction device the open end thereof is attached to the rim of the auto wheel, and the traction tread is stretched out in front and in line of the travel of the auto, having the draw end securely fastened to the ground by means of steel stakes —11— passing through the sockets —9— and —10—. As the engine power is applied to the rear wheels of the automobile, they are caused to draw on the traction tread and forced to travel thereon, moving the automobile from the rut or soft soil in which the car may be stalled. It may be necessary to attach a traction device on each of the power wheels of the auto to avoid slipping or turning within the rear axle of the car.

Having fully described my traction device, what I claim as my invention and desire to secure by Letters Patent is;

A traction device adapted for use with the power wheel of an automobile, comprising double parallel side ropes spaced several inches apart, cross ropes spaced uniformly along the entire length of the double parallel side ropes, means for attaching the ends of the cross ropes to both side ropes, means for attaching one end of the traction strip to the rim of the auto wheel so as to position one of the side ropes on either side of the auto wheel, a spacing block at the opposite end of the said traction strip to hold the side ropes in a parallel position, a draw rope attached to the side ropes outside the spacing block, stake clips mounted in said draw rope, and stakes for attaching said clips and draw rope to the ground.

In witness whereof I sign these specifications.

CHRISTIAN FAUTH.